No. 821,988. PATENTED MAY 29, 1906.
C. H. CRAIG, Jr.
GAGE TESTING APPARATUS.
APPLICATION FILED OCT. 5, 1905.

Witnesses:
wm mathison
E Batchelder

Inventor.
C. H. Craig Jr.
by Wright Brown Quinby & May
Atty's.

UNITED STATES PATENT OFFICE.

CHARLES H. CRAIG, JR., OF WRENTHAM, MASSACHUSETTS, ASSIGNOR TO AMERICAN STEAM GAUGE & VALVE MANUFACTURING COMPANY, OF BOSTON, MASSACHUSETTS, A CORPORATION OF NEW JERSEY.

GAGE-TESTING APPARATUS.

No. 821,988.        Specification of Letters Patent.        Patented May 29, 1906.

Application filed October 5, 1905. Serial No. 281,385.

*To all whom it may concern:*

Be it known that I, CHARLES H. CRAIG, Jr., of Wrentham, in the county of Norfolk and State of Massachusetts, have invented certain new and useful Improvements in Gage-Testing Apparatus, of which the following is a specification.

My invention relates to apparatus for testing pressure-gages, its principal objects being to provide a convenient means for supplying fluid thereto.

It consists in the various features and combinations hereinafter described and more particularly claimed.

Figure 1:
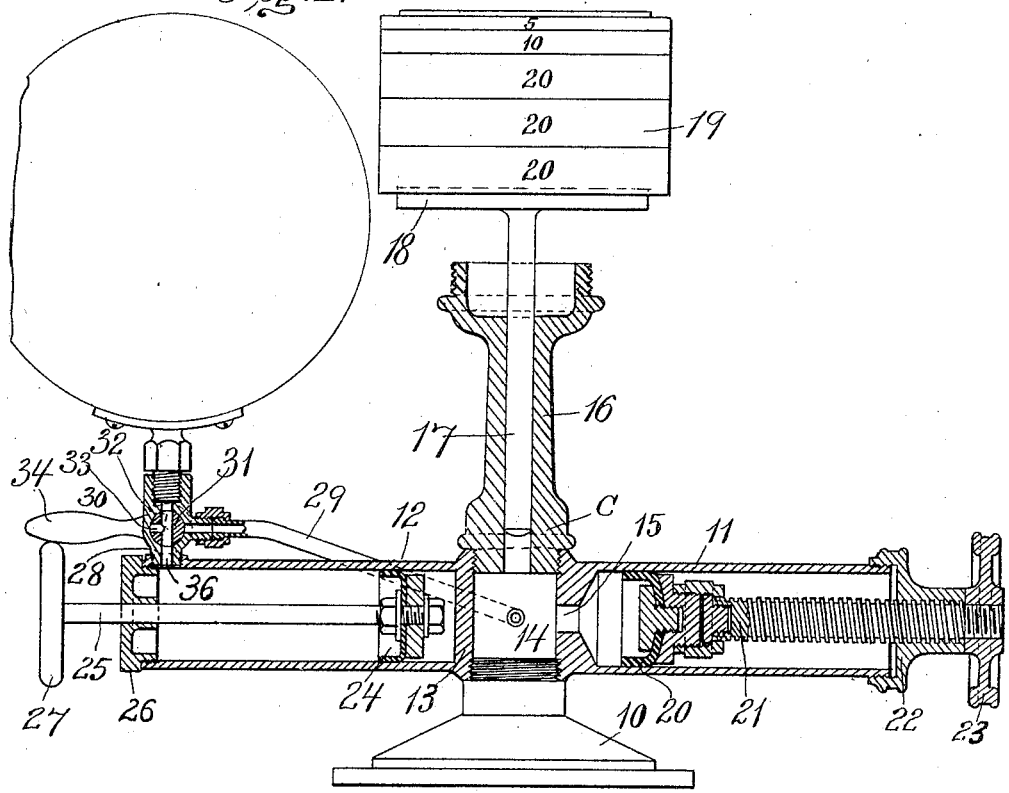
Figure 2:
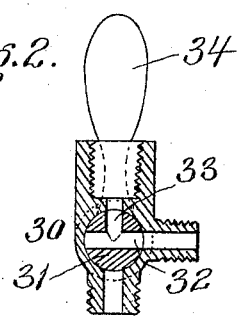

In the accompanying drawings, in which similar characters describe like parts throughout both views, Figure 1 is a vertical section through one embodiment of my invention, and Fig. 2 is a sectional detail of a three-way controlling-cock.

I have here illustrated a casing C, comprising a supporting-base 10, having mounted upon it oppositely-extending cylinders or chambers 11 and 12, projecting from a connecting portion 13, which, as shown, is threaded upon the base, it forming therewith an intermediate chamber 14. This latter chamber is separated from that designated by the numeral 12 by the wall of the connecting portion, while it communicates with the chamber 11 through a passage 15. The casing is completed by a third cylinder or chamber 16 in the form of a standard rising from and being threaded into the connecting portion 13.

In the chamber 16 operates a pressure-applying piston 17, which includes a platform 18, to receive one or more weights 19. The chamber 11 also has a pressure-applying piston 20, the rod 21 of which is threaded through a head 22, closing the outer end of the chamber. A hand-wheel 23, fixed upon the end of this piston-rod, allows it to be rotated. These two pistons 17 and 20 are operated in the customary manner in apparatus of this class to respectively supply a known pressure by means of the weights and to vary the capacity of the apparatus when high pressures are to be tested. The piston 20 and its cylinder may be considered as a pressure-pump, they being here termed the "main pump."

Movable in the chamber 12 is a supply-piston 24, having its rod 25 passing through a head 26 at the outer end of the chamber and being provided at its extremity, outside said head, with a handle 27. These parts serve as a supply or auxiliary pump, the capacity of the chamber 12 being such that it will hold a sufficient quantity of the testing-fluid, usually oil, to fill the tubes of large gages. Through the upper sides of the supply-chamber, adjacent to the head 26, is an opening into which is fitted a holder 28, adapted to receive the gage to be tested and provided with a passage 36, communicating with the chamber 12. At one side of this holder is an opening connected by a pipe or passage 29 with the chamber 14, the holder being therefore in communication with both the pressure-applying chambers. The gage-holder furnishes the casing for a three-way cock or valve 30, the plug 31 of which has a through passage 32, which may connect the supply-cylinder with a gage, and a lateral passage 33, which, together with a portion of the passage 32, may open communication between said gage and the pipe 29. A handle 34 is provided for rotating the plug.

The supply-piston being at its inmost position, its chamber is filled with oil, as is the intermediate chamber 14 and the communicating pressure chambers and pipe 29. The gage to be tested is now attached to the holder, and the handle of the cock being in position to bring the passage 32 into service the supply-piston is drawn outward, causing the oil to rise through the holder and fill the gage-tube. Then the handle is moved to its second position, giving communication through the passages 32 and 33 between the gage and pressure-cylinders. The testing now proceeds, and this having been accomplished the handle 34 is restored to its initial position and the supply-piston forced in, resulting in a withdrawal of the oil from the gage-tube. This permits the removal of the instrument without danger of overflow of oil.

It will be seen that the supply and withdrawal of the testing fluid to and from the gage may be very quickly and readily accomplished, and the advantage of my improved apparatus over those in which the oil must be drawn from a reservoir by an outward movement of the main piston through a laborious rotation of its threaded rod will be obvious.

Having thus described my invention, I claim—

1. A gage-testing apparatus comprising a gage-holder, pressure-applying means, a connection between the gage-holder and the pressure-applying means, a fluid-supply pump communicating with the gage-holder, and means for shutting off the pump from the gage-holder during the testing operation.

2. A gage-testing apparatus comprising a gage-holder, pressure-applying means, a connection between the gage-holder and the pressure-applying means, a fluid-supply pump communicating with the gage-holder, and a valve which may establish communication between either the gage-holder and the pump, or the gage-holder and the pressure-applying means.

3. A gage-testing apparatus comprising a gage-holder, a pressure-pump connected with the gage-holder, and a supply-pump connected with the gage-holder independently of the pressure-pump, and means for making either of the connections between the gage-holder and the pumps operative, and the other connection inoperative.

4. A gage-testing apparatus comprising a gage-holder, a pressure-pump, a supply-pump independent of the pressure-pump, and connections between said elements, including a three-way valve.

5. The combination with a casing having a plurality of chambers, of a pressure-piston operating in one chamber, a supply-piston movable in another chamber, a gage-holder, and means for connecting the gage-holder with either chamber, and at the same time disconnecting it from the other chamber.

6. The combination with a casing having a plurality of chambers, of a pressure-piston operating in one chamber, a supply-piston movable in another chamber, a gage-holder connected by separate passages with the two chambers, and means for simultaneously opening either passage and closing the other.

7. The combination with a casing having a plurality of chambers, of a pressure-piston operating in one chamber, a supply-piston movable in another chamber, a gage-holder carried by the chamber of the supply-piston, passages connecting said holder with the said chambers and means for making either passage operative and the other inoperative.

8. The combination with a casing having a plurality of pressure-chambers, and a supply-chamber, of a weight-piston, and an adjusting-piston operable in one of the pressure-chambers, a gage-holder communicating with the supply-chamber, a passage connecting the gage-holder with the pressure-chambers, and a three-way valve controlling communication between the gage-holder and the chambers.

9. The combination with a casing having a plurality of pressure-chambers, and a supply-chamber, of a weight-piston, and an adjusting-piston operable in one of the pressure-chambers, a gage-holder carried by the supply-chamber and communicating therewith, a pipe leading from the gage-holder to the pressure-chambers, and means for controlling communication between the gage-holder and the said chambers.

10. The combination with a casing having a plurality of pressure-chambers, and a supply-chamber, of a weight-piston, and an adjusting-piston operable in one of the pressure-chambers, a gage-holder carried by the supply-chamber, a pipe leading from the gage-holder to the pressure-chambers, and a three-way valve controlling communication between the gage-holder and the pipe.

In testimony whereof I have affixed my signature in presence of two witnesses.

CHARLES H. CRAIG, Jr.

Witnesses:
C. F. BROWN,
E. BATCHELDER.